(12) United States Patent
Linden

(10) Patent No.: US 8,117,075 B1
(45) Date of Patent: *Feb. 14, 2012

(54) AUTOMATICALLY IDENTIFYING SIMILAR PURCHASING OPPORTUNITIES

(75) Inventor: Greg Linden, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 579 days.

This patent is subject to a terminal disclaimer.

(21) Appl. No.: 12/190,321

(22) Filed: Aug. 12, 2008

Related U.S. Application Data

(62) Division of application No. 09/538,679, filed on Mar. 30, 2000, now Pat. No. 7,428,500.

(51) Int. Cl.
*G06Q 30/00* (2006.01)
(52) U.S. Cl. ................................................. 705/26.1
(58) Field of Classification Search .............. 705/26.1, 705/26, 27
See application file for complete search history.

(56) References Cited

U.S. PATENT DOCUMENTS

| | | | |
|---|---|---|---|
| 5,488,725 A | 1/1996 | Turtle et al. | |
| 5,754,939 A | 5/1998 | Herz et al. | |
| 5,761,497 A | 6/1998 | Holt et al. | |
| 5,835,087 A | 11/1998 | Herz et al. | |
| 5,848,407 A | 12/1998 | Ishikawa et al. | |
| 5,870,717 A | 2/1999 | Wiecha | |
| 5,915,249 A | 6/1999 | Spencer | |
| 5,933,822 A * | 8/1999 | Braden-Harder et al. ............ 1/1 |
| 6,029,195 A * | 2/2000 | Herz ............................ 725/116 |
| 6,092,049 A | 7/2000 | Chislenko et al. | |
| 6,112,203 A | 8/2000 | Bharat et al. | |
| 6,161,084 A | 12/2000 | Messerly et al. | |
| 6,167,398 A | 12/2000 | Wyard et al. | |
| 6,212,517 B1 | 4/2001 | Sato et al. | |
| 6,266,649 B1 | 7/2001 | Linden et al. | |
| 6,295,543 B1 | 9/2001 | Block et al. | |
| 6,298,344 B1 | 10/2001 | Inaba et al. | |
| 6,304,854 B1 | 10/2001 | Harris | |
| 6,317,722 B1 | 11/2001 | Jacobi et al. | |
| 6,356,879 B2 | 3/2002 | Aggarwal et al. | |
| 6,370,525 B1 | 4/2002 | Kaufman | |
| 6,408,294 B1 * | 6/2002 | Getchius et al. .................... 1/1 |

(Continued)

OTHER PUBLICATIONS

Deerwester et al, "Indexing by Latent Semantic Analysis", Journal of the American Society for Information Science, 1990, 34 pages.*

(Continued)

*Primary Examiner* — Mark Fadok
(74) *Attorney, Agent, or Firm* — Thomas, Kayden, Horstemeyer & Risley, LLP

(57) ABSTRACT

A facility for identifying purchasing opportunities within a set of purchasing opportunities that are similar to a distinguished purchasing opportunity is described. The distinguished purchasing opportunity has descriptive information associated with it. For each of several terms occurring in this descriptive information, the facility generates a term score. Each term score reflects the extent to which the occurrence of the term and the descriptive information associated with the distinguished purchasing opportunity differentiates the distinguished purchasing opportunity from auto purchasing opportunities in the set. The facility then selects as key words the terms occurring in the descriptive information associated with the distinguished purchasing opportunity that have the highest term scores. The facility identifies purchasing opportunities of the set containing the selected key words, and establishes a purchasing opportunity score for each identified purchasing opportunity by summing the term score of the key words occurring in information associated with the identified purchasing opportunities.

19 Claims, 4 Drawing Sheets

U.S. PATENT DOCUMENTS

| | | | |
|---|---|---|---|
| 6,421,683 B1 | | 7/2002 | Lamburt |
| 6,460,036 B1 | * | 10/2002 | Herz .............................. 707/748 |
| 6,484,161 B1 | * | 11/2002 | Chipalkatti et al. .................. 1/1 |
| 6,496,206 B1 | | 12/2002 | Mernyk et al. |
| 6,496,843 B1 | * | 12/2002 | Getchius et al. ............. 715/210 |
| 6,609,108 B1 | | 8/2003 | Pulliam et al. |
| 6,785,671 B1 | | 8/2004 | Bailey et al. |
| 7,047,242 B1 | * | 5/2006 | Ponte ..................................... 1/1 |
| 2008/0189232 A1 | * | 8/2008 | Dunning et al. ................ 706/45 |

OTHER PUBLICATIONS

Frakes, William B., "Information Retrieval, Data, Structures & Algorithms," Chapters 2 and 3 (pp. 13-43), Prentice Hall, Inc., 1992 (cited in File History of parent U.S. Appl. No. 09/538,679).

Ives, Brant, "SBT's Six Plus: Versatile, adaptable accounting series," Computer & Software news, V. 6, n. 31, Aug. 1998 (cited in File History of parent U.S. Appl. No. 09/538,679).

Dragan, Richard, "Agent Software," PC Magazine, V. 16, n. 6, Mar. 1997 (cited in File History of parent U.S. Appl. No. 09/538,679).

Hudson, Marion, "Guide to E-Shopping for Office Supplies," OfficeSolutions, Jan. 2000 (cited in File History of parent U.S. Appl. No. 09/538,679).

Savetz, Kevin, "eShopper: resources for web buying," Jan. 2000 (cited in File History of parent U.S. Appl. No. 09/538,679).

"Opensite: Bidstream.com help Web auctions flow more easily," M2 Presswire, Sep. 1999 (cited in File History of parent U.S. Appl. No. 09/538,679).

"Premier Online Auction Search and Pricing Guide Gives Sneak Peek," PR Newswire, Mar. 2000 (cited in File History of parent U.S. Appl. No. 09/538,679).

"Expertelligence Releases Online Auction Comparison for WebData. com; Compare Selections for Products in Multiple Internet Auction Sites Instantly," PR Newswire, Dec. 1998 (cited in File History of parent U.S. Appl. No. 09/538,679).

Maple Drive Lingerie Web Page, archived Mar. 1, 2000 (cited in File History of parent U.S. Appl. No. 09/538,679).

Philips Semiconductor Web Page, http://www.kwantlen.bc.ca/electronics/eltn2319/edata/lab/datasheets/compandor571.html, 1998 (cited in File History of parent U.S. Appl. No. 09/538,679).

Excite Info: Search Help: Search Results http://www.excite.com/info/search_help/search_results/ (Accessed Mar. 3, 2000) (cited in File History of parent U.S. Appl. No. 09/538,679).

File History of U.S. Appl. No. 09/538,679, filed on Mar. 30, 2000 (Office Actions, Responses to Office Actions, Appeal Briefs, Reply Briefs, Opinions by the Board of Appeals, Search Strategies, and other documents deemed relevant).

Amazon.com web pages, 7 pages.

Yahoo! Shopping web pages, 4 pages.

* cited by examiner purchasing opportunity table

| Purchasing Opportunity Identifier (411) | Item Description (412) |
|---|---|
| 100976591 | Archie and Jughead ceramic salt and pepper shakers, in original package, perfect condition |
| 210765112 | electric blue ceramic electrical insulator knobs |
| 263018453 | Black and Decker 10 inch circular saw -- available now |
| ⋮ | ⋮ |
| 342108558 | salt and pepper shakers in form of Archie and Jughead -- eat with your Midvale friends! |
| ⋮ | ⋮ |
| 919822507 | Archie and Jughead golf club head covers - Seller in U.K. |
| 997134614 | yoga book by Sam Delta (State Press - 2000) and accompanying Relax CD by artist Sean Stretch |

*Fig. 4*

AUTOMATICALLY IDENTIFYING SIMILAR PURCHASING OPPORTUNITIES

CROSS REFERENCE TO RELATED APPLICATIONS

This application is a divisional of, and claims priority to, co-pending U.S. patent application entitled "AUTOMATICALLY IDENTIFYING SIMILAR PURCHASING OPPORTUNITIES" filed on Mar. 30, 2000 and assigned application Ser. No. 09/538,679, which is incorporated herein by reference in its entirety.

TECHNICAL FIELD

The present invention is directed to the field of electronic commerce, and, more particularly, to the field of purchasing opportunity analysis.

BACKGROUND

Electronic commerce enables computer users to purchase items, such as products and services, on the World Wide Web in a variety of ways using their computers. For example, opportunities to purchase items online include: online stores that are analogous to brick and mortar stores selling large inventories of items at a fixed price, online classifieds that sell a single item at a fixed price, online auctions in which users bid on an item, online reverse auctions in which sellers bid to sell an item to a user, and online purchase aggregation, in which groups of users aggregate their orders for products.

It can be useful for users to be able to identify similar purchasing opportunities, such as different opportunities to purchase the same or similar items. In the case of one-at-a-time purchasing opportunities such as online classifieds, a user may wish to find additional opportunities to purchase the same item where the user needs more than one of the item. For all kinds of purchasing opportunities, a user may wish to (a) price-shop for the same item, or (b) identify similar items that the user might also wish to purchase, either as an alternative to the first item or in addition to it.

Unfortunately, purchasing opportunities are generally not well-organized with respect to these objectives. Indeed, it is common for purchasing opportunities to be organized into general item categories, such as "office supplies" vs. "kitchen implements." In some cases, purchasing opportunities are not organized at all.

Accordingly, a technique for automatically identifying opportunities to purchase similar items on the World Wide Web would have significant utility.

BRIEF DESCRIPTION OF THE DRAWINGS

FIG. 4 is a data structure diagram showing a purchasing opportunity table preferably used by the facility.

DETAILED DESCRIPTION

Figure 1:
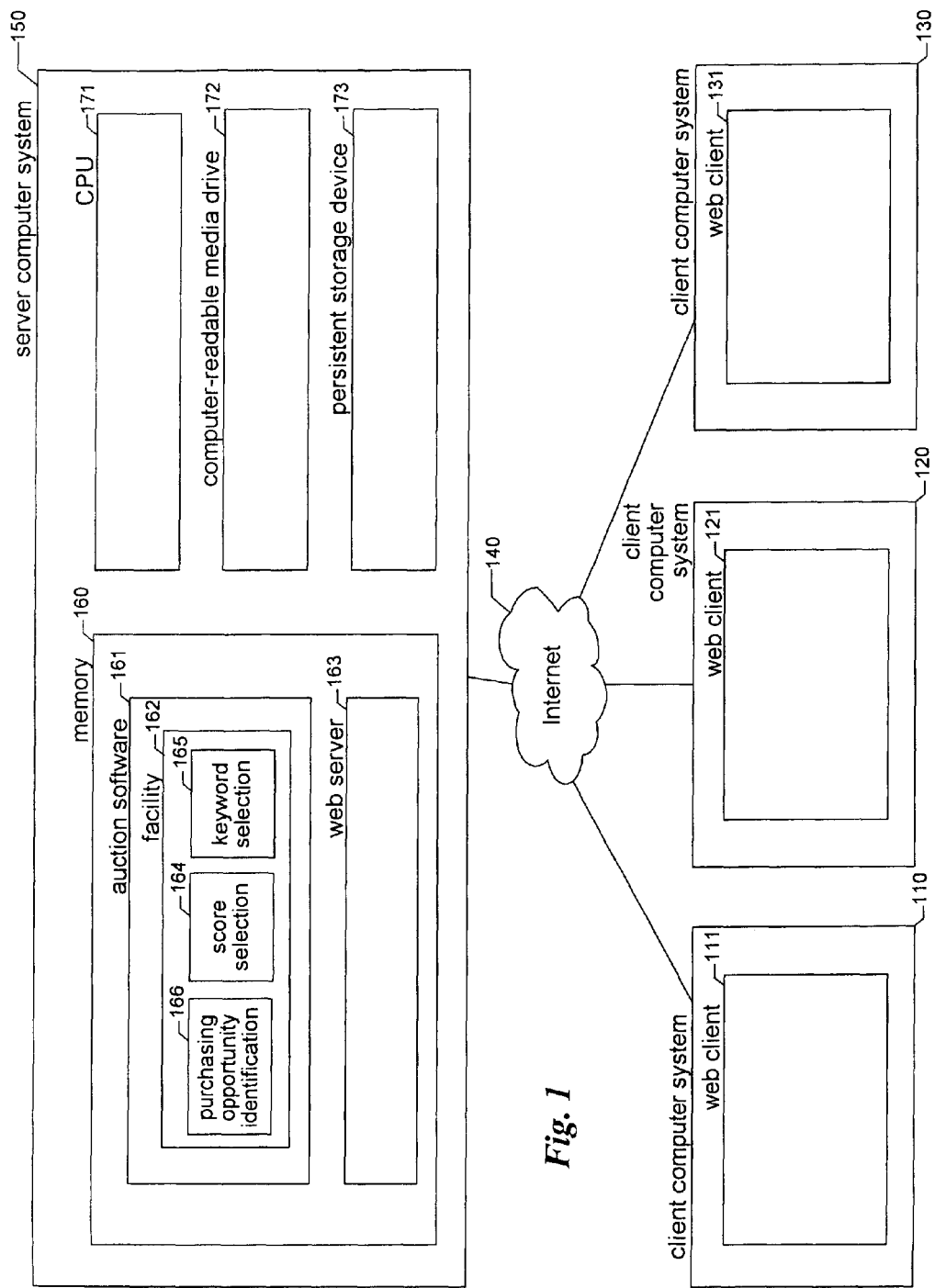
FIG. 1 is a high-level block diagram showing the environment in which the facility preferably operates.

In a preferred embodiment, a software facility for automatically identifying similar purchasing opportunities ("the facility") is provided. For example, for an initial auction, the facility can preferably identify auctions, or purchasing opportunities of other types, that offer the same or a similar item, similar prices or other terms, etc.

The facility preferably uses descriptive information about an initial purchasing opportunity to identify purchasing opportunities that are similar to the initial purchasing opportunity. The descriptive information may include information describing the item offered in the initial purchasing opportunity, as well as information describing other terms of the purchasing opportunity, such as price, availability, seller identity or location, purchasing opportunity type, as well as a variety of other types of information about the initial purchasing opportunity.

The facility first identifies key words occurring in the descriptive information for the initial purchasing opportunity whose occurrence tend to best differentiate the initial purchasing opportunity from others. The facility attributes a score to each key word quantifying this tendency. In a preferred embodiment, the facility identifies key words and attributes scores using the inverse document frequencies of the terms occurring in the descriptive information for the initial purchasing opportunity. The inverse document frequency of a term measures the fraction of occurrences of the term among the descriptive information for all of the purchasing opportunities that occur in the descriptive information for the initial purchasing opportunity. For example, if a particular term occurred three times in the descriptive information for the initial purchasing opportunity and occurred 100 times in the descriptive information for all of the purchasing opportunities, that term would have an inverse document frequency of 3%, or 0.03.

The facility searches the descriptive information for all of the purchasing opportunities to determine, for each key word, which purchasing opportunities' descriptive information contains the key word. In one embodiment, the facility does so by conducting a separate search for each key word, producing, for each key word, a search result containing a list of all of the purchasing opportunities whose descriptive information contain the key word. The facility then generates similarity scores for at least some of the other purchasing opportunities by, for each such purchasing opportunity, summing the scores of key words that occur in the purchasing opportunities.

The purchasing opportunity scores may then be used to order the purchasing opportunities based upon their level of similarity to the initial purchasing opportunity. For example, the facility may order other purchasing opportunities in decreasing order of their similarity to the initial purchasing opportunity. The purchasing opportunity scores may also be used to subset the purchasing opportunities based upon their level of similarity to the initial purchasing opportunity. For example, the facility may subset the other purchasing opportunities to include only the 20 purchasing opportunities that are the most similar to the initial purchasing opportunity, or may subset them to include only the purchasing opportunities that are judged to have at least a 90% likelihood of offering the same item that is offered in the initial purchasing opportunity. By displaying such ordered and/or subsetted lists of purchasing opportunities, the facility enables a user to purchase the same item from multiple sources, price-shop for an item among different sellers and/or purchasing opportunity types, or identify similar items that the user might also wish to purchase, either as an alternative to the first item or in addition to it.

FIG. 1 is a high-level block diagram showing the environment in which the facility preferably operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably includes auction software 161 incorporating the facility 162, as well as a web server computer program 163 for delivering web pages in response to requests from web clients. While items 161-163 are preferably stored in memory while being used, those skilled in the art will appreciate that these items, or portions of them, may be transferred between memory and a persistent storage device 172 for purposes of memory management and data integrity. The server computer system further contains one or more central processing units (CPU) 171 for executing programs, such as programs 161-163, and a computer-readable medium drive 173 for reading information or installing programs such as the facility from computer-readable media, such as a floppy disk, a CD-ROM, or a DVD.

While preferred embodiments are described in terms in the environment described above, those skilled in the art will appreciate that the facility may be implemented in a variety of other environments including a single, monolithic computer system, as well as various other combinations of computer systems or similar devices connected in various ways.

To more fully illustrate its implementation and operation, the facility is described in conjunction with an example.

Figure 2:
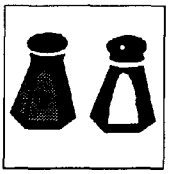
FIG. 2 is a display diagram showing a representative window displayed by the facility.

FIG. 2 is a display diagram showing a representative window displayed by the facility. Window 200 contains descriptive information 210 about a current auction for Archie and Jughead salt and pepper shakers. Information 210 includes such fields as name, current bid, last bid, opening time, closing time, number of bids, starting bid, amount, accepted payment methods, detailed item description, photo, seller identity, shipping fee, customer service policy, and item category. In additional embodiments, other types of data may be included in information 210. The window further includes controls 221 and 222 for bidding on the current auction. A user can use these controls to bid on the auction by typing a bid amount in bid amount field 221, then clicking on "bid" button 222. The window further includes a "see similar auctions" button 223 for displaying information about auctions for similar items. The user may use this control to display information about similar auctions by clicking on the "see similar auctions" button 223. When the user clicks on button 223, the facility analyzes other auctions to identify similar ones. In additional embodiments, the facility can identify auctions for the same item, or purchasing opportunities of various types for the same item or similar items.

Figure 3:
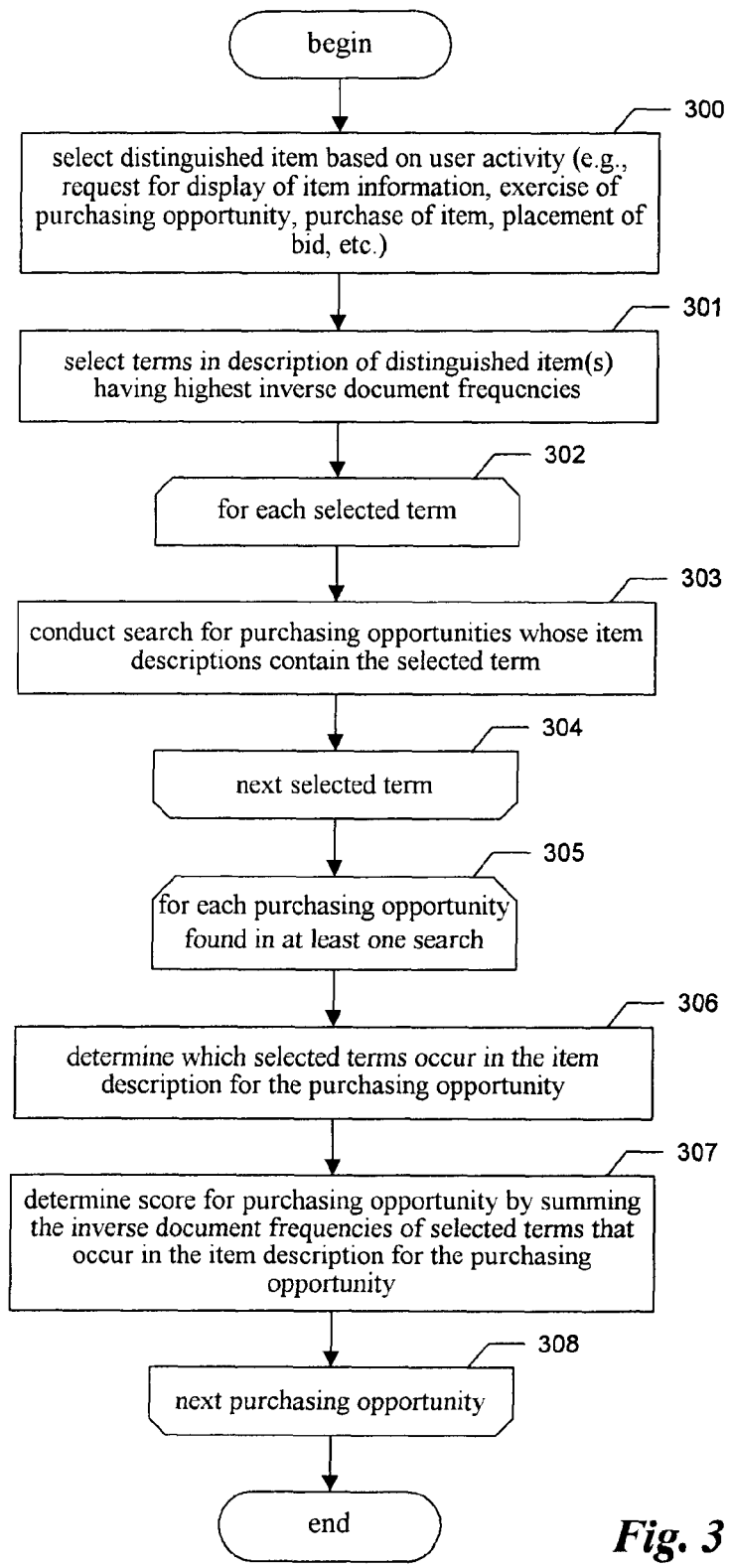
FIG. 3 is flow diagram showing the steps preferably performed by the facility in order to score the similarity of other purchasing opportunities to a distinguished purchasing opportunity.

FIG. 3 is flow diagram showing the steps preferably performed by the facility in order to score the similarity of other purchasing opportunities to a distinguished purchasing opportunity, such as the auction described by information 210. In step 301, the facility selects terms in the description of the distinguished item or items having the highest inverse document frequencies. In various embodiments, terms are selected from various combinations of fields 210. Steps 302-304 constitute a loop that is repeated for each term selected as a key word in step 301. In step 303, the facility conducts a search for purchasing opportunities whose item descriptions contain the selected term. In step 304, if additional selected terms remain, then the facility continues in step 302 to process the next selected term. Steps 305-308 constitute a loop that is repeated for each purchasing opportunity found in at least one of the searches conducted in step 303. In step 306, the facility determines which selected terms occur in the item description for the purchasing opportunity. In step 307, the facility determines a score for the purchasing opportunity by summing the inverse document frequencies of any of the selected terms that occurred in the item description for the purchasing opportunity. In step 308, if additional purchasing opportunities remain, then the facility continues in step 305 to process the next purchasing opportunity. After step 308, the steps conclude.

FIG. 4 is a data structure diagram showing a purchasing opportunity table preferably used by the facility. Each row in the purchasing opportunity table corresponds to a different purchasing opportunity. As shown, each row in the table contains two fields: a purchasing opportunity identifier field 411 contain an identifier that uniquely identifies the purchasing opportunity of the row, and an item description field 412 that contains a description of the item offered in the purchasing opportunity. For example, in row 401, it can be seen that the Archie and Jughead salt and pepper auction shown in FIG. 2 has purchasing opportunity identifier "100976591," and item description "Archie and Jughead ceramic salt and pepper shakers, in original package, perfect condition."

While the descriptive information used by the facility is shown in a single table having only two columns, is shown as corresponding only to the "Detail" field shown in FIG. 2, those skilled in the art will appreciate that this information could be distributed across a large number of different tables, or even stored in a completely different form. Such tables may contain additional columns other than those shown in FIG. 4 and may be stored in compressed or otherwise optimized form. Further, the descriptive information used by the facility may include additional information associated with each purchasing opportunity in addition to or instead of the contents of the "Detail" field.

In one embodiment, the purchasing opportunity table is derived directly from electronic records of purchasing opportunities managed by the operator of the facility. In an additional embodiment, the purchasing opportunity table is compiled by systematically retrieving and analyzing information describing purchasing opportunities managed by others.

In order to find purchasing opportunities similar to the auction shown in FIG. 2, the facility determines the inverse document frequencies of the words, or "terms," occurring in the item description for the auction in FIG. 2, which is referred to as the "distinguished purchasing opportunity." The result is shown below in Table 1.

TABLE 1

| Term From Item Description for Distinguished Purchasing Opportunity | Inverse Document Frequency in Distinguished Item Description |
|---|---|
| Archie | .04123692 |
| and | .00000421 |
| Jughead | .06523911 |
| ceramic | .00127635 |
| salt | .00915263 |
| pepper | .00897250 |
| shakers | .00904123 |
| in | .00000517 |
| original | .00008216 |
| package | .00005972 |
| perfect | .00004257 |

TABLE 1-continued

| Term From Item Description for Distinguished Purchasing Opportunity | Inverse Document Frequency in Distinguished Item Description |
|---|---|
| condition | .00004924 |

The facility uses these inverse document frequencies to identify key words among the terms occurring in the item description for the distinguished purchasing opportunity. In various embodiments, the facility (a) selects any terms having an inverse document frequency higher than a fixed threshold; (b) selects a fixed number of the terms having the highest inverse document frequencies; and (c) selects a fixed percentage of the terms having the highest document frequencies. In the example, the facility utilizes an inverse document frequency absolute threshold of 0.0010000. Accordingly, the facility selects the following terms having inverse document frequencies greater than 0.0010000 as key words, as indicated in Table 1 by the underlining of these terms: Archie, Jughead, ceramic, salt, pepper, shakers.

After identifying the terms listed above as key words, the facility searches the purchasing opportunity table for purchasing opportunities whose items descriptions contain one or more of the key words. In this regard, the facility determines that the item descriptions for the purchasing opportunities having the following purchasing opportunity identifiers contain one or more of the key words: 219765112, 342197558, and 919822507.

The facility next generates a score for each of these three purchasing opportunities by summing the inverse document frequencies of any key words occurring in the item description for each purchasing opportunity. The results are shown below in Table 2.

TABLE 2

| Found Purchasing Opportunity Identifier | Term From Item Description for Found Purchasing Opportunity | Inverse Document Frequency in Distinguished Item Description |
|---|---|---|
| 219765112 | ceramic | .0012735 |
|  |  | .0012735 |
| 342197558 | salt | .00915263 |
|  | pepper | .00897250 |
|  | shakers | .00904123 |
|  | Archie | .04123692 |
|  | Jughead | .06523911 |
|  |  | .13364239 |
| 91982507 | Archie | .04123692 |
|  | Jughead | .06523911 |
|  |  | .10647603 |

The calculated purchasing opportunity scores may be used in a variety of ways. For example, the purchasing opportunity scores may be used to order a list of the found purchasing opportunities from most similar to least similar. In such a list, purchasing opportunity 342197558 would be first, purchasing opportunity 919822507 would second, and purchasing opportunity 219765112 would be third.

The purchasing opportunity scores can further be used to subset the found purchasing opportunities in a variety of ways. For example, the purchasing opportunity scores may be used to subset the list of found purchasing opportunities to include only (a) purchasing opportunities whose scores exceed an absolute threshold; (b) a fixed number of purchasing opportunities having the highest scores; or (c) a fixed percentage of the found purchasing opportunities having the highest scores. In terms of the example, to to identify a group of similar purchasing opportunities, the facility preferably employs an absolute threshold of 0.05000000, thereby including purchasing opportunities 342197558 and 919822507 and excluding purchasing opportunity 219765112. In order to identify purchasing opportunities having a high likelihood of offering the same item as the distinguished purchasing opportunity, the facility preferably applies an absolute threshold of 0.11000000, thereby including purchasing opportunity 919822507 and excluding purchasing opportunities 219765112 and 342197558.

It will be appreciated by those skilled in the art that the above-described facility may be straightforwardly adapted or extended in various ways. For example, the facility may be applied to purchasing opportunities of every conceivable sort. Further, the facility may employ a variety of other approaches to assessing term and purchasing opportunity scores. While the foregoing description makes reference to preferred embodiments, the scope of the invention is defined solely by the claims that follow and the elements recited therein.

I claim:

1. A method in a computer system for identifying documents in a set of documents relevant to a distinguished document, comprising the steps of:
   determining, in the computer system, an inverse document frequency for each one of a plurality of key words within the distinguished document with respect to the set of documents;
   identifying, in the computer system, the key words within the distinguished document having the highest ones of the inverse document frequencies;
   for each of the identified key words, conducting, in the computer system, a search for at least a subset of the documents containing at least one of the identified key words;
   generating, in the computer system, a score associated with each of the at least a subset of the documents, the score calculated by summing the inverse document frequency of each identified key word contained within each of the at least a subset of the documents;
   ranking, in the computer system, the at least a subset of the documents of the set based at least upon the score.

2. The method of claim 1 wherein the ranking is further based at least upon, for each key word, the fraction of occurrences of the key word in the set of documents that occur in the distinguished document.

3. The method of claim 1 wherein the distinguished and ranked documents each describe a purchasing opportunity.

4. The method of claim 1 wherein the distinguished and ranked documents each describe an online auction.

5. The method of claim 1, wherein the step of identifying the key words within the distinguished document having the highest ones of the inverse document frequencies further comprises the step of identifying, in the computer system, the key words having one of the inverse document frequencies greater than a fixed threshold.

6. The method of claim 1, wherein the step of identifying the key words within the distinguished document having the highest ones of the inverse document frequencies further comprises the step of identifying, in the computer system, a fixed number of the key words having the highest ones of the inverse document frequencies.

7. The method of claim 1, wherein the step of identifying the key words within the distinguished document having the highest ones of the inverse document frequencies further comprises the step of identifying, in the computer system, a fixed percentage of the key words having the highest ones of the inverse document frequencies.

8. A system for identifying documents in a set of documents relevant to a distinguished document, comprising:
- a server computer system;
- logic executed in the server computer system that determines an inverse document frequency for each one of a plurality of key words within the distinguished document with respect to the set of documents;
- logic executed in the server computer system that identifies the key words within the distinguished document having the highest ones of the inverse document frequencies;
- logic that, for each of the identified key words, conducts a search for documents from the set of documents containing at least one of the identified key words; and
- logic that, for each document identified in the search, identifies a relevant document where a sum of the inverse document frequencies of the identified keywords contained in the document exceeds a threshold.

9. The system of claim 8, further comprising logic executed in the server computer system that performs a separate search for each of the identified keywords.

10. The system of claim 8, further comprising logic that ranks the documents identified in the search based at least upon the sum of the inverse document frequencies of the identified key words, wherein the ranking is further based upon, for each key word, the fraction of occurrences of the key word in the set of documents that occur in the distinguished document.

11. The system of claim 8, wherein the distinguished document describe a purchasing opportunity.

12. The system of claim 8, wherein the distinguished document describe an online auction.

13. The system of claim 8, wherein the logic executed in the server computer system that identifies the key words within the distinguished document having the highest ones of the inverse document frequencies further comprises logic that identifies the key words having one of the inverse document frequencies greater than a fixed threshold.

14. The system of claim 8, wherein the logic executed in the server computer system that identifies the key words within the distinguished document having the highest ones of the inverse document frequencies further comprises logic that identifies a fixed number of the key words having the highest ones of the inverse document frequencies.

15. The system of claim 8, wherein the logic executed in the server computer system that identifies the key words within the distinguished document having the highest ones of the inverse document frequencies further comprises logic that identifies a fixed percentage of the key words having the highest ones of the inverse document frequencies.

16. A system for identifying documents in a set of documents relevant to a distinguished document, comprising:
- means for determining an inverse document frequency for each one of a plurality of key words within the distinguished document with respect to the set of documents;
- means for identifying the key words within the distinguished document having the highest ones of the inverse document frequencies;
- means for conducting, for each of the identified key words, a search for at least a subset of the documents containing at least one of the identified key words;
- means for generating a score associated with each of the at least a subset of the documents, the score calculated by summing the inverse document frequency of each identified key word contained within each of the at least a subset of the documents;
- means for ranking the at least a subset of the documents of the set based at least upon the score.

17. The system of claim 16, wherein the means for identifying the key words within the distinguished document having the highest ones of the inverse document frequencies further comprises means for identifying the key words having one of the inverse document frequencies greater than a fixed threshold.

18. The system of claim 16, wherein the means for identifying the key words within the distinguished document having the highest ones of the inverse document frequencies further comprises means for identifying a fixed number of the key words having the highest ones of the inverse document frequencies.

19. The system of claim 16, wherein the means for identifying the key words within the distinguished document having the highest ones of the inverse document frequencies further comprises means for identifying a fixed percentage of the key words having the highest ones of the inverse document frequencies.

* * * * *